United States Patent
Aggarwal et al.

(10) Patent No.: US 12,380,738 B1
(45) Date of Patent: Aug. 5, 2025

(54) SYSTEM TO DETERMINE COMPACT REPRESENTATION OF DATA

(71) Applicant: AMAZON TECHNOLOGIES, INC., Seattle, WA (US)

(72) Inventors: Manoj Aggarwal, Seattle, WA (US); Gerard Guy Medioni, Los Angeles, CA (US); Lavisha Aggarwal, Seattle, WA (US); Prithviraj Banerjee, Redmond, WA (US); Jiuhong Xiao, Long Island, NY (US); Rajeev Ranjan, Seattle, WA (US); Dilip Kumar, Seattle, WA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 789 days.

(21) Appl. No.: 17/457,302

(22) Filed: Dec. 2, 2021

(51) Int. Cl.
| | |
|---|---|
| *G06V 40/50* | (2022.01) |
| *G06F 18/214* | (2023.01) |
| *G06F 18/22* | (2023.01) |
| *G06T 9/00* | (2006.01) |
| *G06V 40/10* | (2022.01) |

(52) U.S. Cl.
CPC ............ *G06V 40/50* (2022.01); *G06F 18/214* (2023.01); *G06F 18/22* (2023.01); *G06T 9/00* (2013.01); *G06V 40/11* (2022.01)

(58) Field of Classification Search
CPC .......................................... G06T 2207/20081
See application file for complete search history.

(56) References Cited

U.S. PATENT DOCUMENTS

| | | | |
|---|---|---|---|
| 2022/0012815 A1* | 1/2022 | Kearney | G06N 20/20 |
| 2022/0327678 A1* | 10/2022 | Fauber | G06N 3/04 |
| 2023/0230288 A1* | 7/2023 | Besenbruch | G06N 3/047 |
| | | | 382/232 |

OTHER PUBLICATIONS

Agustsson, et al., "Soft-to-Hard Vector Quantization for End-to-End Learning Compressible Representations", pp. 1-16. Retrieved from the Internet: URL: https://arxiv.org/pdf/1704.00648.pdf.
Balle, et al., "Variational Image Compression with a Scale Hyperprior", ICLR 2018, pp. 1-23. Retrieved from the Internet: URL: https://arxiv.org/pdf/1802.01436.pdf.

(Continued)

*Primary Examiner* — Ayodeji O Ayotunde
(74) *Attorney, Agent, or Firm* — Lindauer Law, PLLC

(57) ABSTRACT

During enrollment to a biometric identification system an image of at least a portion of a user is acquired and processed to determine a compact representation (CR). The CR may be stored for later comparison to identify the user, to train embedding models, and so forth. The image is not stored. A machine learning system that comprises a variational autoencoder is trained to produce the CR with a loss function that includes a distortion loss, an embedding distance loss, and in some implementations a bitrate loss. The trained encoder is used to determine the CR from an input image, while the decoder is not stored. The CR contains sufficient information to be used as training data for embedding models, instead of acquired images. Training may be more computationally efficient using the CR. Recognition comparisons may be more efficiently performed using the CR, compared to query images.

20 Claims, 9 Drawing Sheets

(56) References Cited

OTHER PUBLICATIONS

Bian, et al., "A Deep Image Compression Framework for Face Recognition", Jul. 4, 2019, pp. 1-10. Retrieved from the Internet: URL: https://arxiv.org/pdf/1907.01714.pdf.

Hu, et al., "Learning End-to-End Lossy Image Compression: A Benchmark", IEEE, pp. 1-15. Retrieved from the Internet: URL: https://arxiv.org/pdf/2002.03711v1.pdf.

Johnston, et al., "Computationally Efficient Neural Image Compression", Google Research, 9 pages. Retrieved from the Internet: URL: https://arxiv.org/pdf/1912.08771v1.pdf.

Mentzer, et al., "High-Fidelity Generative Image Compression", 34th Conference on Neural Information Processing Systems (NeurIPS 2020), pp. 1-12. Retrieved from the Internet: URL: https://proceedings.neurips.cc/paper/2020/file/8a50bae297807da9e97722a0b3fd8f27-Paper.pdf.

Minnen, et al., "Joint Autoregressive and Hierarchical Priors for Learned Image Compression", 32nd Conference on Neural Information Processing Systems (NeurIPS 2018), pp. 1-10. Retrieved from the Internet: URL: https://proceedings.neurips.cc/paper/2018/file/53edebc543333dfbf7c5933af792c9c4-Paper.pdf.

Rocca, et al., "Understanding Variational Autoencoders (VAEs)", Towards Data Science, Sep. 23, 2019, 34 pages. Retrieved from the Internet: URL: https://towardsdatascience.com/understanding-variational-autoencoders-vaes-f70510919173.

Schroff, et al., "FaceNet: A Unified Embedding for Face Recognition and Clustering", CVPR 2015, pp. 815-823. Retrieved from the Internet: URL: https://openaccess.thecvf.com/content_cvpr_2015/papers/Schroff_FaceNet_A_Unified_2015_CVPR_paper.pdf.

Theis, et al., "Lossy Image Compression with Compressive Autoencoders", ICLR 2017, pp. 1-19. Retrieved from the Internet: URL: https://arxiv.org/pdf/1703.00395.pdf.

Toderici, et al., "Variable Rate Image Compression with Recurrent Neural Networks", Under review as a conference paper at ICLR 2016, pp. 1-11. Retrieved from the Internet: URL: https://arxiv.org/pdf/1511.06085v3.pdf.

Wang, et al., "Scalable Facial Image Compression with Deep Feature Reconstruction", IEEE ICIP 2019, pp. 2691-2695. Retrieved from the Internet: URL: http://www.jdl.link/doc/2011/20191223_08803255.pdf.

Wen, et al., "Variational Autoencoder Based Image Compression with Pyramidal Features and Context Entropy Model", CVPR Workshop, pp. 4321-4324. Retrieved from the Internet: URL: https://openaccess.thecvf.com/content_CVPRW_2019/papers/CLIC%202019/Wen_Variational_Autoencoder_based_Image_Compression_with_Pyramidal_Features_and_Context_CVPRW_2019_paper.pdf.

Zhou, et al., "Variational Autoencoder for Low Bit-rate Image Compression", CVPR Workshop, pp. 2617-2620. Retrieved from the Internet: URL: https://openaccess.thecvf.com/content_cvpr_2018_workshops/papers/w50/Zhou_Variational_Autoencoder_for_CVPR_2018_paper.pdf.

* cited by examiner

SYSTEM TO DETERMINE COMPACT REPRESENTATION OF DATA

BACKGROUND

Biometric input data may be used to assert an identity of a user.

BRIEF DESCRIPTION OF FIGURES

The detailed description is set forth with reference to the accompanying figures. In the figures, the left-most digit(s) of a reference number identifies the figure in which the reference number first appears. The use of the same reference numbers in different figures indicates similar or identical items or features. The figures are not necessarily drawn to scale, and in some figures, the proportions or other aspects may be exaggerated to facilitate comprehension of particular aspects.

Figure 1:
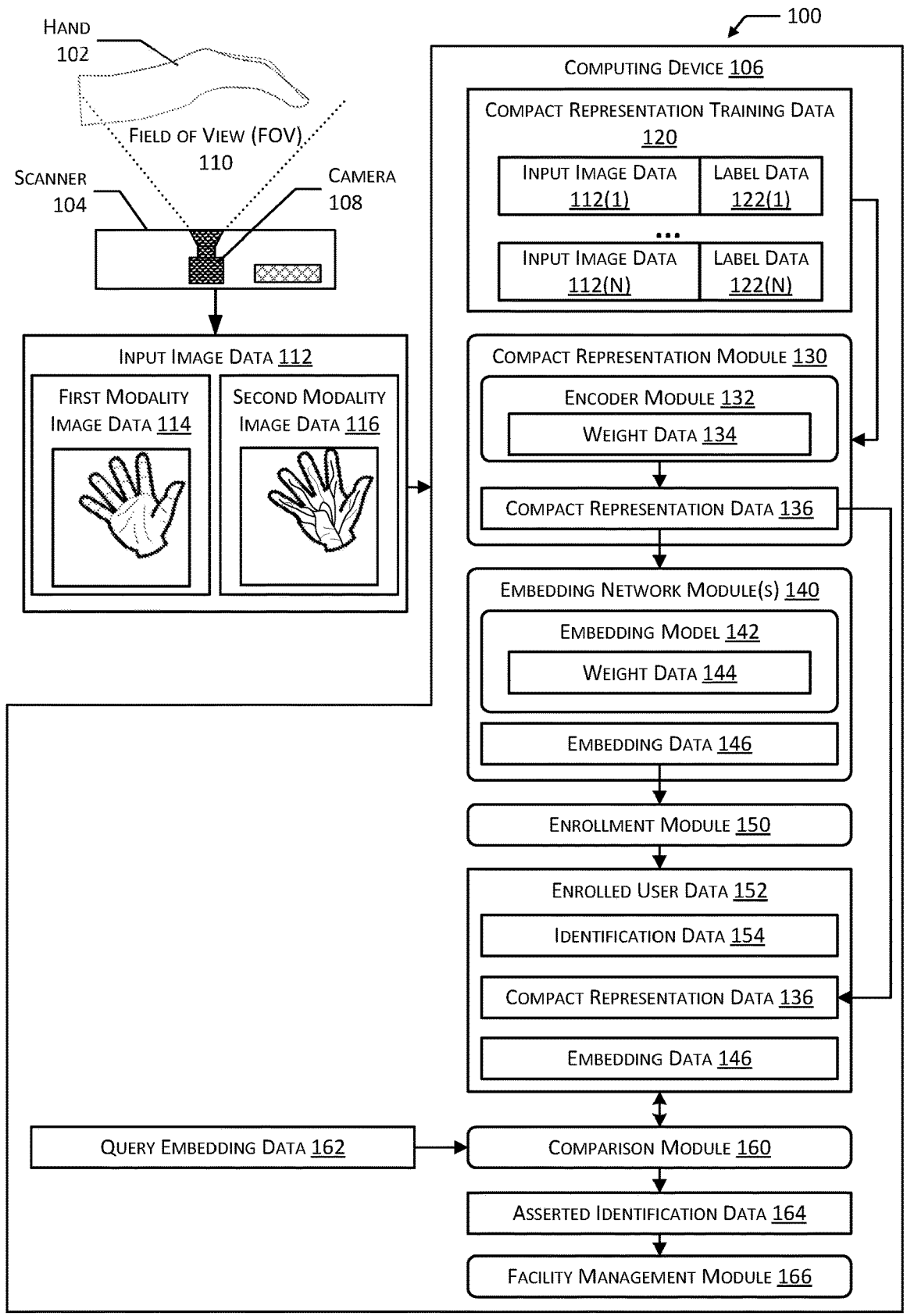
FIG. 1 illustrates a system to determine a compact representation of image data in a biometric identification system, according to some implementations.

While implementations are described herein by way of example, those skilled in the art will recognize that the implementations are not limited to the examples or figures described. It should be understood that the figures and detailed description thereto are not intended to limit implementations to the particular form disclosed but, on the contrary, the intention is to cover all modifications, equivalents, and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION

Input data, such as used for biometric identification, may be acquired using one or more modalities. For example, a first modality may comprise images of surface skin of a user's palm while a second modality may comprise images of subcutaneous features such as veins of the user's palm. The use of multi-modality input data provides several advantages for biometric identification.

Traditional biometric identification systems obtain input data during enrollment and store this input data as a "gallery". This gallery facilitates further development and refinement of the traditional identification system. Development may include updates to algorithms used to characterize the input data. For example, a first neural network may be trained to process an input image and generate a first embedding that comprises a vector value representative of the features depicted in that input image. Later, a second neural network may be trained to generate a second embedding that may be deemed advantageous to use going forward. In such systems, the input images in the gallery are processed with the second neural network to generate the second embeddings.

Because the gallery contains information that may be deemed to be private by users, legal entities, and so forth, the information therein must be safeguarded from impermissible access. As a result, substantial efforts are taken to prevent disclosure of information in the gallery.

One inadequate option is to retain only the first embeddings, and not store gallery data. However, this approach requires user input if an update changes the embedding. For example, without the gallery data to generate the second embeddings each user of the system would need to perform the enrollment process again. Such repeated efforts may annoy users, limit improvement of the identification system, substantially increase costs associated with an update, and so forth.

Described in this disclosure are techniques to reduce or eliminate altogether retention of input data for a biometric identification system. Instead, a compact representation of the input data may be stored. The gallery is eliminated, removing privacy and security concerns. Future updates to the biometric identification system are possible without re-enrollment by training future embedding models using the compact representation data. During subsequent operation to identify a user, a query input image may be processed to determine a query compact representation. The query compact representation may then be processed using an embedding model to determine embedding data. The embedding data may then be compared with embedding data of previously enrolled users.

A compact representation module, during training, incorporates an encoder module and a decoder module of a variational autoencoder and an embedding model. The compact representation module may also incorporate a hyperprior entropy model during operation. During training, a loss function is used to train the encoder module that comprises a distortion loss, embedding distance loss, and in some implementations bitrate loss. The bitrate loss considers the reduction in size of data of the compact representation compared to the input image. The distortion loss considers the difference between a reconstructed image created resulting from the output of the encoder module as compared to the input image. The embedding distance loss considers the distance between first embedding data based on the input image and second embedding data based on the reconstructed image. By using this loss function, the encoder module "learns", such as expressed as weight data of weights and bias values within the encoder module, to develop a compact representation that is small in terms of data size and provides a feature-rich representation of the input image that is suitable for use by an embedding model.

Once training is complete, information associated with the decoder module, such as the weight values resulting during training, may be discarded. Once discarded, the reconstruction of the original input from the compact representation becomes infeasible.

Once training is complete, the trained encoder module may be used to generate compact representation data. The compact representation may be used by other systems instead of image data. For example, the compact representation data may be stored as enrolled user data along with identification data.

The compact representation data may be used to train other embedding models. Compared to image data, the compact representation data is more computationally efficient during processing, such as training or inference. For example, the compact representation data is a smaller size (in terms of bits) than the associated image data, reducing memory requirements, computational requirements, and so forth.

By using the techniques described in this disclosure, a biometric identification system is able to operate and be updated without storing a gallery, such as images of a user's hands. Operation without the retention of a gallery is possible using the compact representation data. This affords a substantial increase in user privacy by eliminating the possibility of inadvertent release of gallery data, while maintaining a high level of accuracy in operation of the system. The compact representation data also substantially reduces data storage requirements compared to gallery data. Performance during operations using the compact representation data, such as training and identification, are also improved as the compact representation data may be more efficiently processed.

Illustrative System

FIG. 1 illustrates a system 100 to determine a compact representation of image data, according to some implementations. The system 100 is described as being used to improve security and facilitate the reduction of data retained as part of a biometric identification system that determines an identity of a user. However, the system and techniques described herein may be used in other situations.

A hand 102 of a user is depicted positioned above a scanner 104. The scanner 104 may include a computing device 106 and a camera 108. The camera 108 has a field of view (FOV) 110. During operation of the scanner 104, the camera 108 acquires images of an object in the FOV 110, such as the hand 102, and provides input image data 112. The scanner 104 may include other components which are not shown. For example, the scanner 104 may include lights that illuminate the object in the FOV 110.

In the implementation depicted, the hand 102 is held above the camera 108, with the FOV 110 extending upward. In other implementations, other configurations may be used. For example, the camera 108 may have the FOV 110 extending downwards, and the user may place their hand 102 in the FOV 110 under the scanner 104.

In one implementation, the scanner 104 is configured to acquire images of the hand 102 that are illuminated using infrared light that has two or more particular polarizations, with different illumination patterns, and so forth. For example, during operation the user may present their hand 102 with the palm or volar region of the hand toward the scanner 104. As a result, the input image data 112 provides an image of the anterior portion of the hand 102. In other implementations, the input image data 112 may include the back of the hand 102. Separate images may be acquired using different combinations of polarized light provided by the infrared lights.

Depending upon the polarization used, the images produced by the scanner 104 may be of first modality features or second modality features. The first modality may utilize images in which the hand 102 is illuminated with light having a first polarization and obtained by the camera 108 with a polarizer passing light to the camera 108 that also has the first polarization. First modality features may comprise features that are close to, or on, a surface of the hand 102 of the user. For example, the first modality features may include surface features such as creases, wrinkles, scars, dermal papillae ridges, and so forth in at least the epidermis of the hand 102. Images acquired using the first modality may be associated with one or more surface features.

Second modality features comprise those features that are below the epidermis. The second modality may utilize images in which the hand 102 is illuminated with light having a second polarization and obtained by the camera 108 with the polarizer passing light to the camera 108 with the first polarization. For example, the second modality features may include subcutaneous anatomical structures such as veins, bones, soft tissue, and so forth. Some features may be visible in both first modality and second modality images. For example, a crease in the palm may include first modality features on the surface as well as deeper second modality features within the palm. Images acquired using the second modality may be associated with one or more subcutaneous features.

Separate images of the first and second modalities may be acquired using different combinations of polarized light provided by infrared lights. In this illustration, the input image data 112 comprises first modality image data 114 and second modality image data 116. The first modality image data 114 and the second modality image data 116 of the same object may be acquired in rapid succession with respect to one another. For example, the camera 108 may operate at 60 frames per second and acquire the first modality image data 114 in a first frame and the second modality image data 116 in a second frame.

In the implementation depicted here, the scanner 104 does not include a guide, scan plate, or other structure that constrains the pose or position of the hand 102. The omission of the guide may improve sanitary operation of the system. For example, by removing the guide, the user's hand 102 does not come into physical contact with a structure, eliminating the possibility of contact transmission of contaminants, disease, and so forth. By removing the physical contact, the need for surface cleaning of the guide between users may be eliminated.

In another implementation, the scanner 104 may include a structure such as a guide or scan plate to constrain at least some movement of the hand 102. For example, the scan plate may comprise a flat pane of glass which the hand 102 may rest upon, and the camera 108 may then acquire an image.

Compact representation training data 120 may comprise input image data 112, such as input image data 112 acquired using one or more modalities. For example, the compact representation training data 120 may comprise first modality image data 114 and second modality image data 116. The input image data 112 in the compact representation training data 120 may be associated with label data 122. For example, the label data 122 may be indicative of modality, identity and so forth.

The compact representation training data 120 may comprise one or more of actual input data with associated label data 122 or synthetic input data with associated label data 122. The actual input data may comprise actual input image data 112 that has been acquired from individuals who have opted in to provide training data. In one implementation, the compact representation training data 120 may exclude individuals who have enrolled to use of the system for identification. In another implementation, some enrolled users may opt in to explicitly permit input image data 112 obtained during enrollment to be stored as actual input data for later training.

A compact representation module 130 includes an encoder module 132 that is trained using the compact representation training data 120 to determine compact representation data 136. The encoder module 132 may comprise a neural network or other machine learning system that, during training, determines weight data 134. The weight data 134 may comprise weight values, bias values, or other values associated with operation of nodes within the machine learning system.

During training, a loss function is utilized to provide feedback that modifies the weight data 134 responsive to the results produced during a particular training iteration. In one implementation, the compact representation module 130 during training comprises a variational autoencoder backbone that is used in conjunction with an embedding model. The variational autoencoder includes an encoder module to determine a compact representation of an input image, while a decoder module processes the compact representation to reconstruct the image. The variational autoencoder backbone may implement a hyper-prior entropy model during training. The compact representation module 130 uses a previously trained embedding model to provide first embedding data based on the input image and second embedding data based on the reconstructed image.

A loss function utilized during training of the encoder module 132 includes loss values: distortion loss, embedding distance loss, and in some implementations a bitrate loss. The bitrate loss considers the reduction in size of data of the compact representation compared to the input image. The distortion loss considers the difference between a reconstructed image created resulting from the output of the encoder module 132 as compared to the input image. The embedding distance loss considers the distance between first embedding data based on the input image and second embedding data based on the reconstructed image. By using this loss function, the encoder module "learns", such as expressed as weight data 134 of values associated with nodes or other elements within the encoder module, to develop a compact representation that is small in terms of data size and provides a feature-rich representation of the input image that is suitable for use by an embedding model. During later use of the system, a different embedding model other than that used during training of the encoder module 130 may be used. Training and operation of the compact representation module 130 is discussed in more detail in the following figures.

The system includes one or more embedding network modules 140 comprising one or more embedding models 142 and associated weight data 144. Once trained, an embedding model 142 accepts input image data 112 or compact representation data 136 as input and produces as output embedding data 146. The embedding data 146 is representative of at least some of the features represented in the input. In some implementations, the embedding data 146 may comprise a vector value in an embedding space. The embedding data 146 may comprise a vector representative of 512 dimensions. In some implementations, the embedding models 142 may be trained to determine the weight data 144 using compact representation data 136 as input.

Users are able to utilize the system 100 by performing an enrollment process. An enrollment module 150 may coordinate the enrollment process. Enrollment may associate biometric information, such as compact representation data 136 and embedding data 146, with particular information such as a name, account number, and so forth.

During an enrollment process, the user opts in and presents their hand 102 to the scanner 104. The scanner 104 provides input image data 112 to a computing device 106. The computing device 106 may include one or more of the trained encoder module 132 or a trained embedding model 142. The scanner 104 may encrypt and send the input image data 112 or data based thereon such as compact representation data 136, embedding data 146, and so forth to another computing device 106 such as a server. The server may process the compact representation data 136 to determine the embedding data 146.

During the enrollment process, the submitted embedding data 146 may be checked to determine whether the user has been previously enrolled. A successful enrollment may comprise storage of enrolled user data 152 comprising identification data 154, such as name, telephone number, account number, and so forth. The identification data 154 may be associated with one or more of the compact representation data 136 or the embedding data 146 as enrolled user data 152. In some implementations, the enrolled user data 152 may comprise additional information associated with processing of the input image data 112 with an embedding model 142. For example, the enrolled user data 152 may comprise intermediate layer data, such as the values of a penultimate layer of the embedding model 142.

During subsequent usage, such as at a second time, the (as yet unidentified) user presents their hand 102 at a scanner 104. The resulting query input image data 112 may be processed by the trained encoder module 132 to determine query compact representation data. The query compact representation data may then be processed by the embedding network modules 140 to determine query embedding data 162.

A comparison module 160 compares the query embedding data 162 to the first embedding data 146 stored in the enrolled user data 152 to determine asserted identification data 164. In one implementation, the asserted identification data 164 may comprise a user identifier associated with the closest previously stored embedding data 146 in the enrolled user data 152 to the query embedding data 162 associated with the user who presented their hand 102. The comparison module 160 may utilize other considerations, such as requiring that the query embedding data 162 is no more than a maximum distance in the embedding space from the embedding data 146 of a particular user before determining the asserted identification data 164.

The asserted identification data 164 may then be used by subsequent systems or modules. For example, the asserted identification data 164, or information based thereon, may be provided to a facility management module 166.

The facility management module 166 may use the asserted identification data 164 to associate an identity with that user as they move about the facility. For example, the facility management module 166 may use data from cameras or other sensors in the environment to determine a location of the user. Given a known path of the user from an entrance that utilizes the scanner 104, the user identity indicated in the identification data 154 may be associated with the user as they use the facility. For example, the now identified user may walk to a shelf, remove an item, and leave the facility. The facility management module 166 may determine the interaction data indicative of the removal of the item as being associated with the user identifier specified in the asserted identification data 164, and bill an account associated with the user identifier. In another implementation, the facility management module 166 may comprise a point of sale system. The user may present their hand 102 at checkout to assert their identity and pay using a payment account that is associated with their identity.

The system 100 may continue to undergo changes over time. At a later time, a second embedding model 142(2) is developed. These embedding models 142 may be trained using the compact representation data 136 as training data. For example, at a later time a second embedding model 142(2), compared to a first embedding model 142(1) used by the compact representation module 130 during training, may comprise a different neural network architecture, may utilize a different loss function, and so forth.

This second embedding model 142(2) generates second embedding data 146(2) that is within a second embedding space. The second embedding space may differ from a first embedding space. For example, the second embedding space may have a different number of dimensions from the first embedding space. In another example, the first embedding space and the second embedding space may have the same overall dimensionality, but one or more specified dimensions in the first embedding space are not collinear with one or more specified dimensions in the second embedding space. In some implementations, embedding spaces may share one or more common dimensions, or may be completely disjoint.

The differences between the first embedding data 146(1) in the first embedding space and the second embedding data 146(2) in the second embedding space may make them incompatible for direct comparison by the comparison module 160 without further processing.

With the storage of the compact representation data 136, for the system 100 to continue to operate after the use of the second embedding model 142(2), additional actions would be necessary, such as performing the enrollment process again, acquiring and processing the input image data 112 with the second embedding model 142(2) in order to determine the second embedding data 146(2) for retention in the enrolled user data 152. However, this is annoying to users, time intensive, and costly. Each time an embedding model 142 is changed to utilize a different embedding space, such action would need to be taken. As a result, development may be stifled. In comparison, by storing the compact representation data 136 in the enrolled user data 152 the compact representation data 136 may be used to develop subsequent embedding data 146 and subsequent embedding models 142 are used.

By using the system and techniques described in this disclosure, gallery data comprising input image data 112 acquired during enrollment is not retained. This improves overall privacy for the user, reduces a quantity of data that has to be securely stored, and still allows for ongoing updates to the embedding network modules 140.

The systems and techniques described above are discussed with respect to images of human hands. These systems and techniques may be used with respect to other forms of data, other kinds of objects, and so forth. For example, these techniques may be used for facial recognition systems, object recognition systems, and so forth.

Figure 2A:
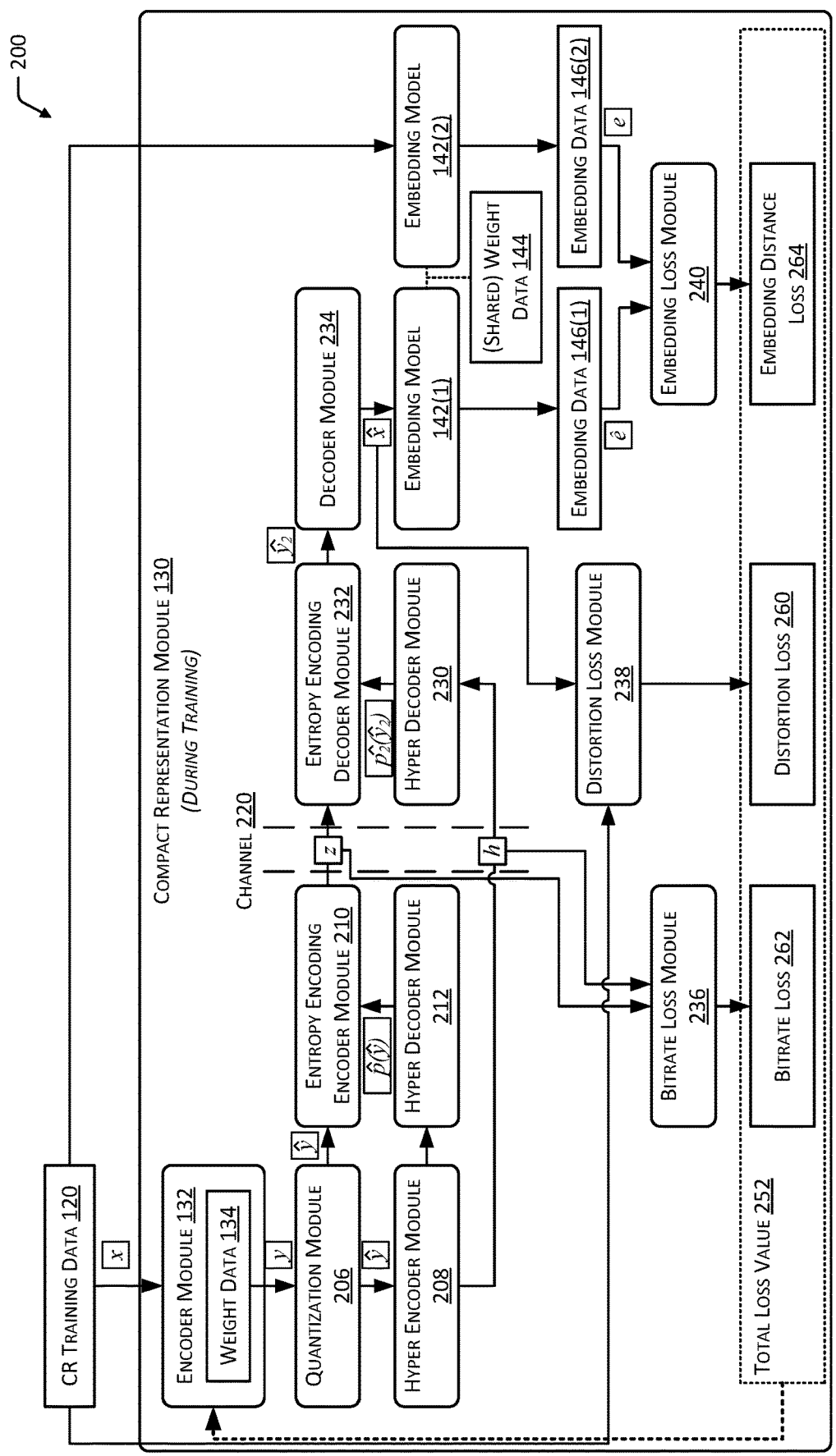
FIG. 2A illustrates training of a compact representation module having an encoder module, according to some implementations.

FIG. 2A illustrates at 200 training the compact representation module 130 having an encoder module 132, according to some implementations.

The compact representation module 130 may comprise the encoder module 132, a quantization module 206, a hyper encoder module 208, an entropy encoding encoder module 210, and a hyper decoder module 212. During training as shown here, the compact representation module 130 may also comprise a hyper decoder module 230, an entropy encoding decoder module 232, a decoder module 234, a bitrate loss module 236, a distortion loss module 238, one or more embedding models 142 utilizing shared weight data 144, and an embedding loss module 240. In some implementations (not shown), the compact representation module 130 may include one or more modules to provide functions such as cropping, alignment, sizing, and so forth of the input to the compact representation module 130. For example, a module may resize, crop, and align images to a canonical pose of a hand prior to processing by the embedding models 142.

In the implementation depicted here, the compact representation module 130 comprises some elements of an autoencoder architecture with scale hyperprior as an entropy model. (See Ballé, Johannes, et al. "Variational image compression with a scale hyperprior." International Conference on Learning Representations (2018).) The hyperprior arrangement uses a hyperprior encoder-decoder model to predict prior distribution of latent representation based on the context.

The CR training data 120 comprises one or more input image data 112, an image being designated in the following discussion as "x". The encoder module 132 comprises a machine learning system that is trained, using a total loss value 252 discussed below to modify the weight data 134 associated with operation of the encoder module 132. A first image "x" of the CR training data 120 is provided as input to the encoder module 132. The output from the encoder module 132 comprises a first latent representation designated in the following discussion as "y".

The first latent representation y is then processed by the quantization module 206. The quantization module 206 provides as output a first quantized latent representation designated $\hat{y}$ ("y hat"). The first quantized latent representation $\hat{y}$ is provided as input to two modules: the hyper encoder module 208 and the entropy encoding encoder module 210. In some implementations the quantization may utilize a rounding function. (See Mentzer, Fabian, et al. "High-Fidelity Generative Image Compression." Advances in Neural Information Processing Systems 33 (2020).)

The first quantized latent representation $\hat{y}$ is then processed by the hyper encoder module 208. The hyper encoder module 208 provides as output first channel data "h" comprising transferred hyper bytes. The first channel data h is provided as input to two modules: the hyper decoder module 212 and the hyper decoder module 230. (See Ballé, Johannes, et al. "Variational image compression with a scale hyperprior." International Conference on Learning Representations (2018).)

The first channel data h is then processed by the hyper decoder module 212. The hyper decoder module 212 provides as output a first predicted distribution "$\hat{p}(\hat{y})$". The first predicted distribution $\hat{p}(\hat{y})$ is provided as input to the entropy encoding encoder module 210.

During training, the first channel data h is also processed by the hyper decoder module 230. The hyper decoder module 230 provides as output a second predicted distribution "$\hat{p}_2(\hat{y}_2)$". The second predicted distribution $\hat{p}_2(\hat{y}_2)$ is provided as input to the entropy encoding decoder module 232. In some implementations, a single hyper decoder module 212 may be used, and the resulting first predicted distribution $\hat{p}(\hat{y})$ may be used by subsequent modules.

The entropy encoding encoder module 210 accepts as input the first quantized latent representation designated $\hat{y}$ and the first predicted distribution $\hat{p}(\hat{y})$. The entropy encoding encoder module 210 provides as output second channel data "z". Once the compact representation module 130 has been trained, the compact representation data 136 may comprise or be based on one or more of the second channel data z, the first quantized latent representation designated $\hat{y}$, or the latent representation y. The latent representation y may contain the most information about the input image. The first quantized latent representation designated $\hat{y}$ and second channel data z may be deemed to have the same or approximately the same amount of information about the input image. These implementations are discussed with respect to FIGS. 2B-2D.

In this illustration, the channel 220 is representative of the transfer of data from an encoder portion of the compact representation module 130 to a decoder portion. Once training is complete, the information associated with the decoder portion may be discarded. The discard of this information results in the reconstruction of the original input image from the compact representation data 136 being infeasible.

During training, the entropy encoding decoder module 232 accepts as input the second channel data z and the second predicted distribution $\hat{p}_2(\hat{y}_2)$. The entropy encoding decoder module 232 provides as output a second quantized latent representation $\hat{y}_2$.

During training, the decoder module 234 accepts as input the second quantized latent representation $\hat{y}_2$. The decoder module 234 provides as output a reconstructed image "$\hat{x}$" (x hat).

A first embedding model 142(1) accepts as input the reconstructed image $\hat{x}$. The first embedding model 142(1) uses (shared) weight data 144 and provides as output first embedding data 146(1) "$\hat{e}$". The first embedding model 142(1) has been previously trained to determine the first embedding data 146(1).

The embedding model 142 used during training of the compact representation module 130 may comprise a single embedding model, a plurality or ensemble of multiple embedding models, a decorrelated embedding model associated with multiple modalities, and so forth. In some implementations, compared to an embedding model 142 used to produce the query embedding data 162, the embedding model 142 used during training of the compact representation module 130 may have greater complexity, may produce embedding data 146 with greater dimensionality, and so forth. For example, the embedding model 142 used during training of the compact representation module 130 may comprise an ensemble of many embedding models from which their respective output is aggregated to produce embedding data 146.

A second embedding model 142(2) accepts as input the input image x. The second embedding model 142(2) uses the (shared) weight data 144 and provides as output second embedding data 146(2) "e". The second embedding model 142(2) has been previously trained to determine the second embedding data 146(2). In some implementations, a single embedding model 142 may be operated twice during a training iteration, to produce the first embedding data 146(1) and then the second embedding data 146(2).

The bitrate loss module 236 accepts as input the first channel data h and the second channel data z and determines a bitrate loss 262. In one implementation, the bitrate loss module 236 may determine the bitrate loss ($L_r$) as:

$L_r = \text{BPP}(z) + \text{BPP}(h)$ where BPP(z) is the bits per pixel of the second channel data z, and
BPP(h) is the bits per pixel of the first channel data h.
(Equation 1)
In one implementation, the BPP may be determined as:

$$BPP = \frac{\text{file\_size} * 8 * 1024}{\text{num\_pixel}}$$

where file_size is the size in bytes of the input and num_pixel is the total number of pixels in the input.
(Equation 2)
In other implementations, other functions may be used to determine the bitrate loss 262. The bitrate loss module 236 and use of the bitrate loss 262 as part of the total loss value 252 allows the encoder module 132 to be trained to minimize the size of the compact representation data 136 while taking into consideration the other loss factors such as distortion and embedding distance.

In some implementations, the bitrate loss module 236 and the bitrate loss 262 may be omitted from the compact representation module 130 and the determination of the total loss value 252.

The distortion loss module 238 accepts as input the input image x and the reconstructed image $\hat{x}$ and determines a distortion loss 260. In one implementation, the distortion loss 260 may be determined as:

$L_d = \text{MSE}(\hat{x}, x)$ where MSE is a mean-square error function.
(Equation 3)
In another implementation the distortion loss 260 may be determined as:

$L_d = \text{MS\_SSIM}(\hat{x}, x)$ where MS_SSIM is a multi-scale structural similarity index measure function.
(Equation 4)
For example, MS_SSIM may be determined as:

$$SSIM(x, y) = \frac{(2\mu_x\mu_y + c_1)(2\sigma_{xy} + c_2)}{(\mu_x^2 + \mu_y^2 + c_1)(\sigma_x^2 + \sigma_y^2 + c_2)}$$

where $\mu_x$, $\mu_y$, $\sigma_x$, $\sigma_y$, $\sigma_{xy}$ are the mean value of x, the mean value of y, the standard deviation of x, the standard deviation of y, and the covariance between x and y, respectively. $c_1$, $c_2$ are small constants.
(Equation 5)
The SSIM is calculated for each pixel using the mean value and standard deviation in sliding windows. MS_SSIM is a multi-scale version of SSIM.

In other implementations, other functions may be used to determine the distortion loss 260. The distortion loss module 238 and the use of the distortion loss 260 as part of the total loss value 252 allows the encoder module 132 to be trained to minimize the distortion introduced by the encoder, while taking into consideration the other loss factors such as the bitrate and embedding distance.

The embedding loss module 240 accepts as input the first embedding data 146(1) $\hat{e}$ and the second embedding data 146(2) e and determines an embedding distance loss 264. In one implementation, the embedding distance loss 264 ($L_e$) may be determined as:

$$L_e = \text{cosine\_distance}(\hat{e}, e)$$

(Equation 6)

In other implementations, other functions may be used to determine the embedding distance loss 264. The embedding loss module 240 and the use of the embedding distance loss 264 as part of the total loss value 252 allows the encoder module 132 to be trained to minimize the differences in embedding data 146 that are introduced by the encoder, while taking into consideration the other loss factors such as the bitrate and distortion.

While the embedding distance loss 264 is based on the embedding data 146 obtained from an embedding model 142, subsequent changes to the embedding model(s) 142 used by the system 100 are independent of this. For example, an initial embedding model 142 may be used to determine the embedding data 146 used for training the compact representation module 130. At a later time, an embedding model 142 (219) may be trained using the compact representation data 136 to determine embedding data 146 (219). The initial embedding model 142 and the later embedding model 142 (219) may differ in operation, architecture, complexity, dimensionality, and so forth. However, the inclusion of the embedding distance loss 264 into the training of the compact representation module 130 allows for learning to provide output that preserves at least some of the information that is subsequently used by embedding models 142.

A total loss value 252 is determined based on the bitrate loss 262, the distortion loss 260, and the embedding distance loss 264. The total loss value 252 may be provided to the encoder module 132 to train the encoder portion of the compact representation module 130. For example, the total loss value 252 may modify one or more values of the weight data 134.

The total loss function used to determine the total loss value 252 (L) implemented as described before may be expressed as:

$$L = \gamma_d L_d + \gamma_r L_r + \gamma_e L_e$$

where $\gamma_d, \gamma_r, \gamma_e$ are constants that may be used to vary the weighting accorded to a particular element.

(Equation 7)

While the training of the compact representation module 130 is described with respect to image data, in other implementations other data may be provided as input. For example, audio data comprising data representative of human speech may be used as input. The compact representation module 130 may be trained to provide compact representation data 136 representative of that audio data. For example, the system 100 may be used to determine identity based at least in part on the user's voice.

Figure 2B:
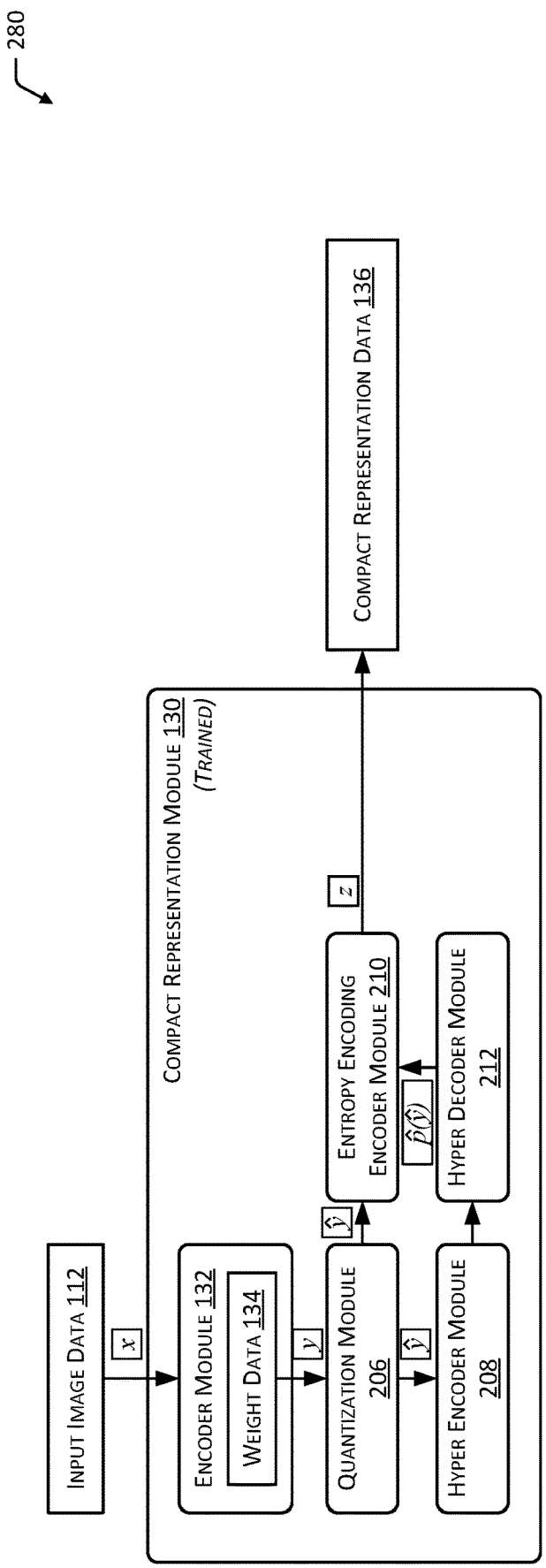
FIG. 2B illustrates use of a trained compact representation module that uses channel data as the compact representation data, according to some implementations.

FIG. 2B illustrates at 280 a trained compact representation module 130 that utilizes the second channel data z as the compact representation data, according to some implementations. Once training is complete, the decoder portion of the system may be disregarded. For example, the decoder module 234 and related weight data may be deleted.

The compact representation module 130 once training is complete may comprise the encoder module 132, the weight data 134, the quantization module 206, the hyper encoder module 208, the entropy encoding encoder module 210, and the hyper decoder module 212. Input image data 112 is processed by the trained compact representation module 130 and compact representation data 136 comprising the second channel data z is provided as output.

The second channel data z provides a highly compact representation of the input image data 112, compared to other representations such as the first quantized latent representation ŷ, or the latent representation y. In some implementations, use of the second channel data z as the compact representation data 136 may be chosen to minimize size of the data that is then provided to a subsequent embedding model 142, to minimize the size of data stored within the enrolled user data 152, and so forth.

The second channel data z is within an entropy-encoding bitstream domain, and not within the image matrix domain of the input image data 112. As a result, an embedding model 142 or other subsequent system utilizing such compact representation data 136 are designed accordingly.

Figure 2C:
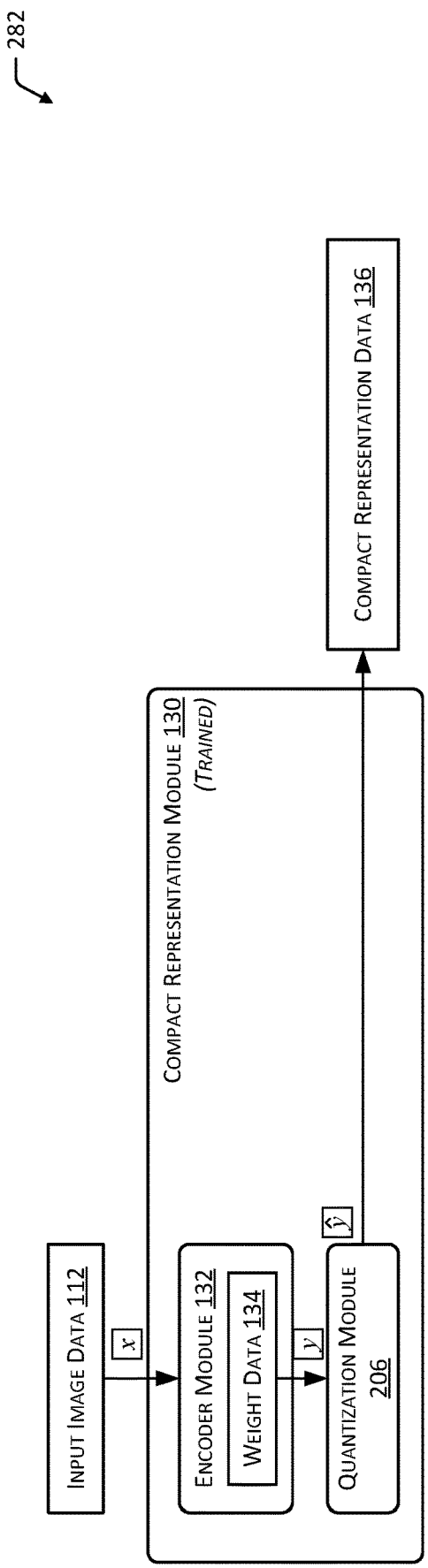
FIG. 2C illustrates use of a trained compact representation module that uses a quantized latent representation as the compact representation data, according to some implementations.

FIG. 2C illustrates at 282 a trained compact representation module 130 that utilizes the quantized latent representation ŷ as the compact representation data 136, according to some implementations. Once training is complete, the decoder portion, entropy portions of the system may be disregarded. For example, the decoder module 234 and related weight data may be deleted.

The compact representation module 130 once training is complete may comprise the encoder module 132, the weight data 134, and the quantization module 206. Input image data 112 is processed by the trained compact representation module 130 and compact representation data 136 comprising the first quantized latent representation ŷ is provided as output.

The first quantized latent representation ŷ provides compact representation of the input image data 112 that is within the image matrix domain. As a result, such compact representation data 136 may be readily used with existing embedding models 142 or other systems. For example, the compact representation data 136 comprising the first quantized latent representation ŷ may be used to train an embedding model 142. Because of the reduced size, compared to the input image x and the characteristics associated with the first quantized latent representation ŷ, such training may require less memory, be computationally more efficient, complete more quickly, and so forth.

With regard to size, the first quantized latent representation ŷ may be larger than the second channel data z and smaller than the latent representation y. In some implementations, the latent representation y may be smaller than the input image x.

Figure 2D:
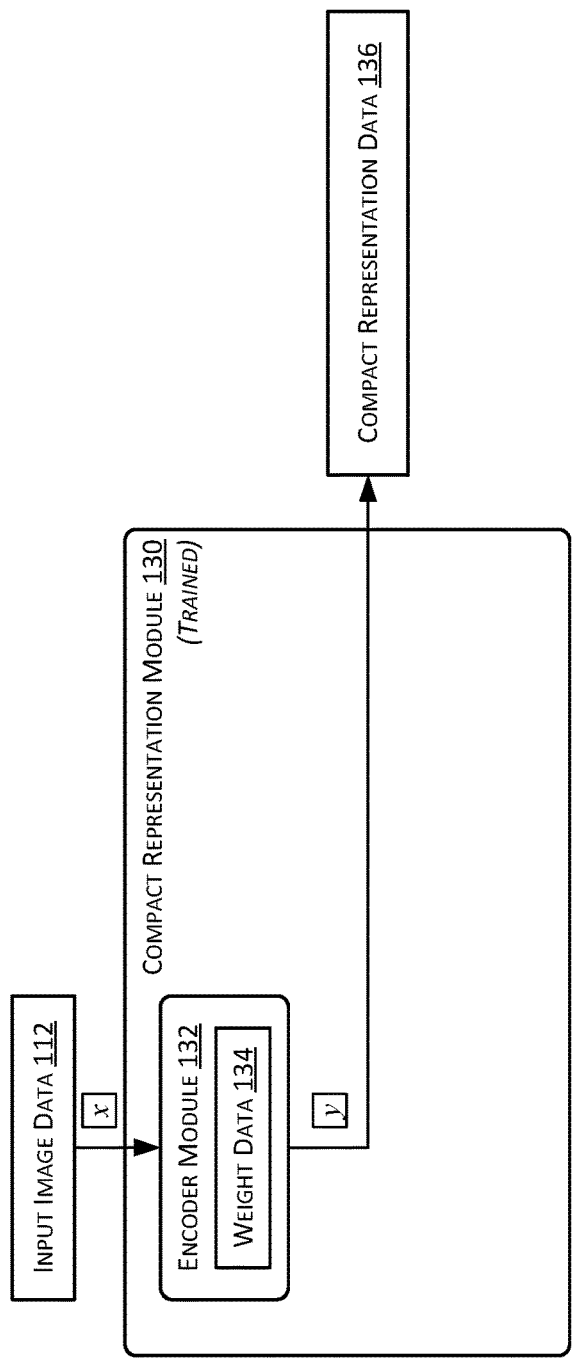
FIG. 2D illustrates use of a trained compact representation module that uses a latent representation as the compact representation data, according to some implementations.

FIG. 2D illustrates at 284 a trained compact representation module 130 that utilizes the latent representation y as the compact representation data 136, according to some implementations. Once training is complete, the decoder portion, entropy portions of the system may be disregarded. For example, the decoder module 234 and related weight data may be deleted.

The compact representation module 130 once training is complete may comprise the encoder module 132 and the associated weight data 134. Input image data 112 is processed by the trained compact representation module 130 and compact representation data 136 comprising the latent representation y is provided as output.

The latent representation y provides compact representation of the input image data 112 that is within the image matrix domain. As a result, such compact representation data 136 may be readily used with existing embedding models 142 or other systems. For example, the compact representation data 136 comprising the latent representation y may be used to train an embedding model 142. Because of the reduced size, compared to the input image x and the characteristics associated with the latent representation y, such training may require less memory, be computationally more efficient, complete more quickly, and so forth. With regard to size, the latent representation y may be smaller than the input image x.

Figure 3:
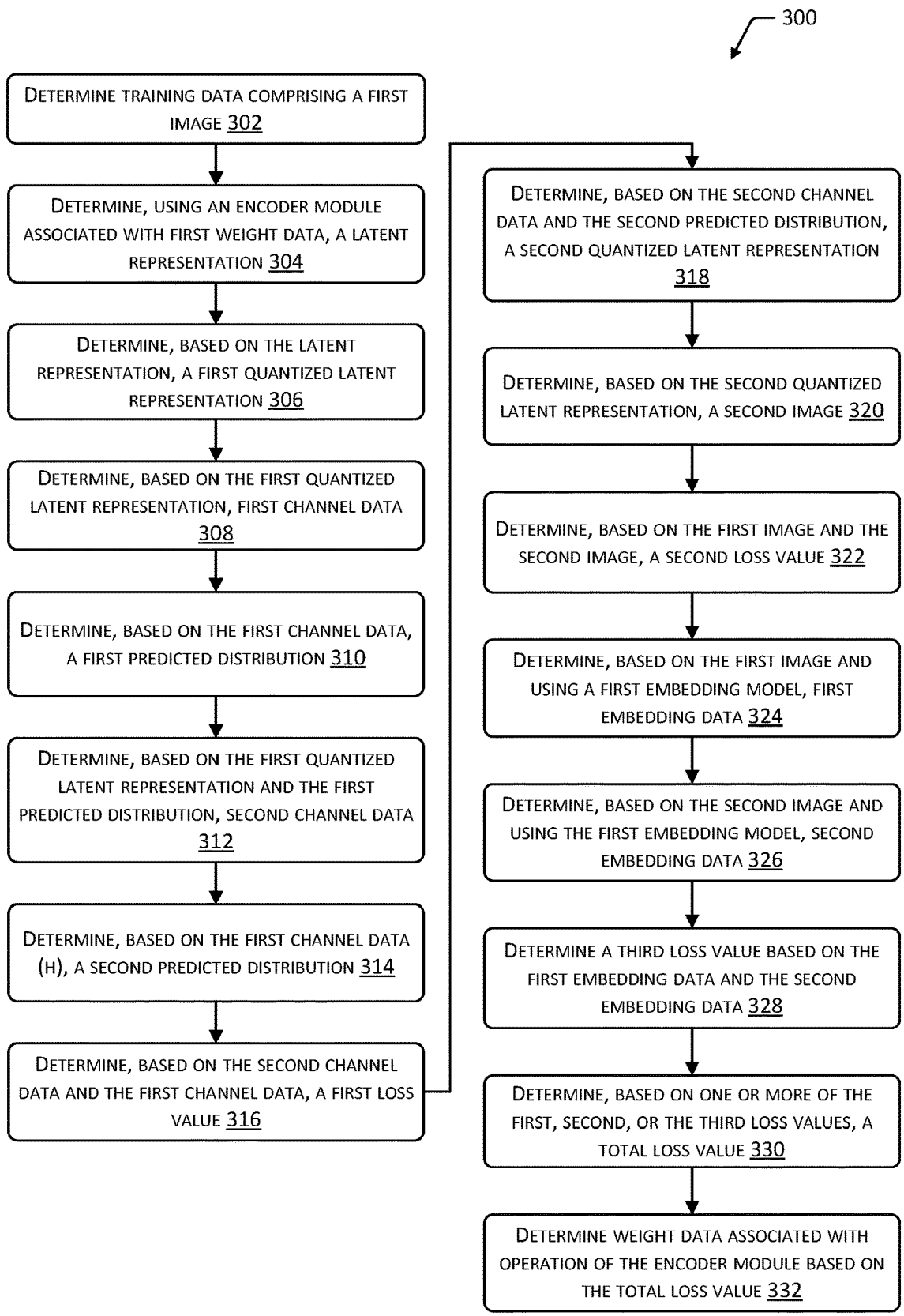
FIG. 3 illustrates a process to train an encoder module, according to some implementations.

FIG. 3 illustrates a process 300 to train an encoder module 132, according to some implementations. The process may be implemented at least in part using one or more computing devices 106.

At 302 training input data comprising a first image is determined. For example, compact representation training data 120 may be acquired that comprises input image data 112.

At 304 a first latent representation is determined using an encoder module 132 that is associated with first weight data 134. For example, the encoder module 132 accepts as input the first image and determines as output the first latent representation.

At 306 a first quantized latent representation is determined based on the first latent representation. For example, the quantization module 206 accepts as input the first latent representation and determines as output the first quantized latent representation.

At 308 first channel data is determined based on the first quantized latent representation. For example, the hyper encoder module 208 may accept as input the first quantized latent representation and determine as output the first channel data.

At 310 a first predicted distribution is determined based on the first channel data. For example, the hyper decoder module 212 may accept as input the first channel data and determine as output the first predicted distribution.

At 312 second channel data is determined based on the first quantized latent representation and the first predicted distribution. For example, the entropy encoding encoder module 210 may accept as input the first quantized latent representation and the first predicted distribution and determine the second channel data.

At 314 a second predicted distribution is determined based on the first channel data. For example, the hyper decoder module 230 may accept as input the first channel data and determine as output the second predicted distribution.

At 316 a first loss value is determined based on the second channel data and the first channel data. For example, the first loss value may comprise the bitrate loss 262 determined using the bitrate loss module 236. In some implementations, the determination of the first loss value may be omitted, and the process may omit operation 316 and proceed to 318.

At 318 a second quantized latent representation is determined based on the second channel data and the second predicted distribution. For example, the entropy encoding decoder module 232 accepts as input the second channel data and the second predicted distribution and determines as output the second quantized latent representation.

At 320 a second (reconstructed) image is determined using the decoder module 234 and based on the second quantized latent representation.

At 322 a second loss value is determined based on the first image and the second image. For example, the second loss value may comprise the distortion loss 260 determined using the distortion loss module 238.

At 324 first embedding data 146(1) is determined based on the first image and using a first embedding model 142(1). For example, the first image is processed by the embedding network module 140.

At 326 second embedding data 146(2) is determined based on the second image and using the first embedding model 142(1) or a second embedding model 142(2) that has shared weight data 144 with the first embedding model 142(1). For example, the second image is processed by the embedding network module 140.

At 328 a third loss value is determined based on the first embedding data 146(1) and the second embedding data 146(2). For example, the third loss value may comprise the embedding distance loss 264 determined using the embedding loss module 240.

At 330 a total loss value 252 is determined based on one or more of the first loss value, the second loss value, or the third loss value. In one implementation, the total loss value 252 may be determined based on the first loss value, the second loss value, and the third loss value. In another implementation the total loss value 252 may be determined based on the second loss value and the third loss value.

At 332 at least a portion of the first weight data 134 is determined based at least in part on the total loss value 252.

Figure 4:
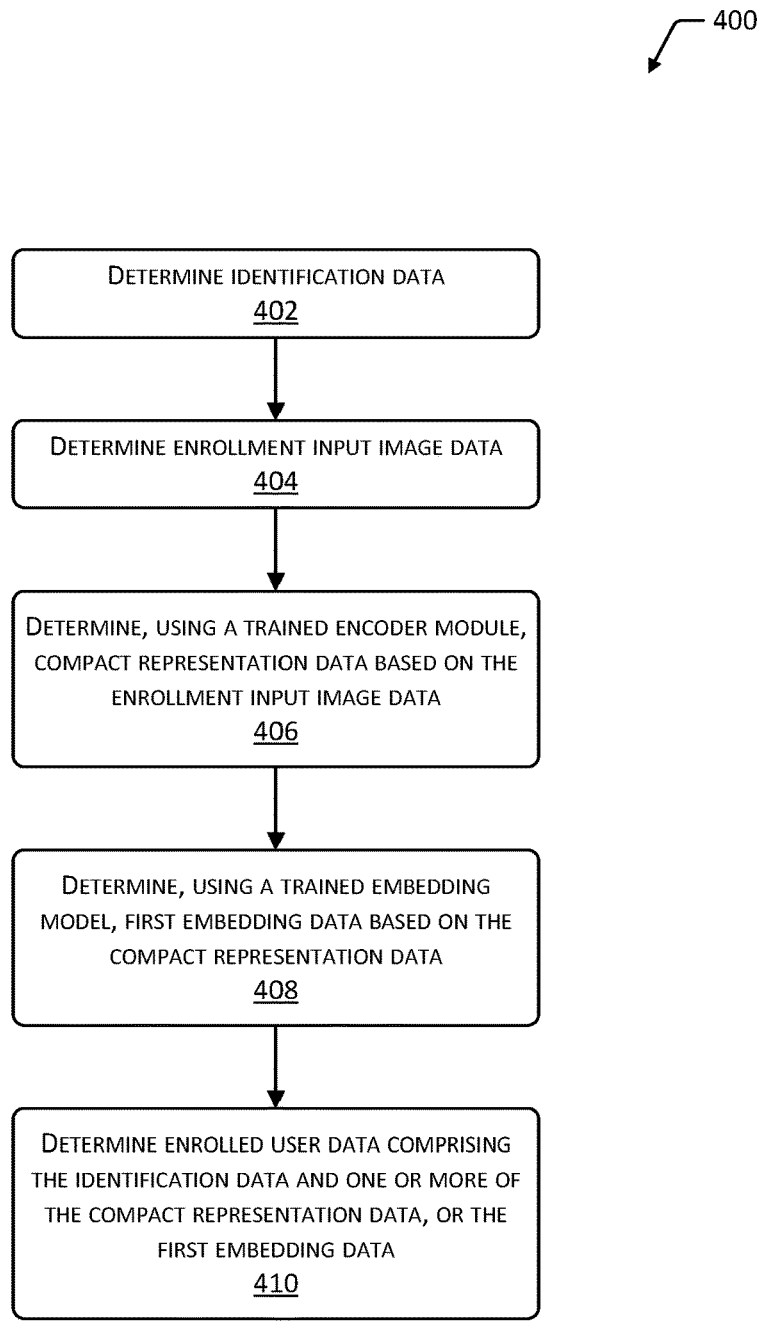
FIG. 4 illustrates a process of determining enrolled user data comprising a compact representation, according to some implementations.

FIG. 4 illustrates at 400 a process of determining enrolled user data 152 comprising compact representation data 136, according to some implementations. The process may be implemented at least in part using one or more computing devices 106.

At 402 identification data 154 is determined and associated with a first user. For example, a first user may use the enrollment module 150 to provide identification data 154.

At 404 enrollment input image data of the first user is determined. For example, the scanner 104 may be used to acquire input image data 112. The input image data 112 may comprise one or more modalities.

At 406 first compact representation data 136 is determined by using the enrollment input image data as an input to the trained encoder module 132. The trained encoder module 132 may implement at least a portion of the weight data 134.

At 408 first embedding data 146 is determined using a trained embedding model 142 based on the first compact representation data 136. For example, the first compact representation data 136 is provided as input to the trained embedding model 142 that provides as output the first embedding data 146. In some implementations, this operation may be omitted and the process may proceed to 410.

At 410 enrolled user data 152 is determined comprising the identification data 154 and one or more of the compact representation data 136 or the first embedding data 146. The enrolled user data 152 associates the identification data 154 with the one or more of the compact representation data 136 or the first embedding data 146.

Figure 5:
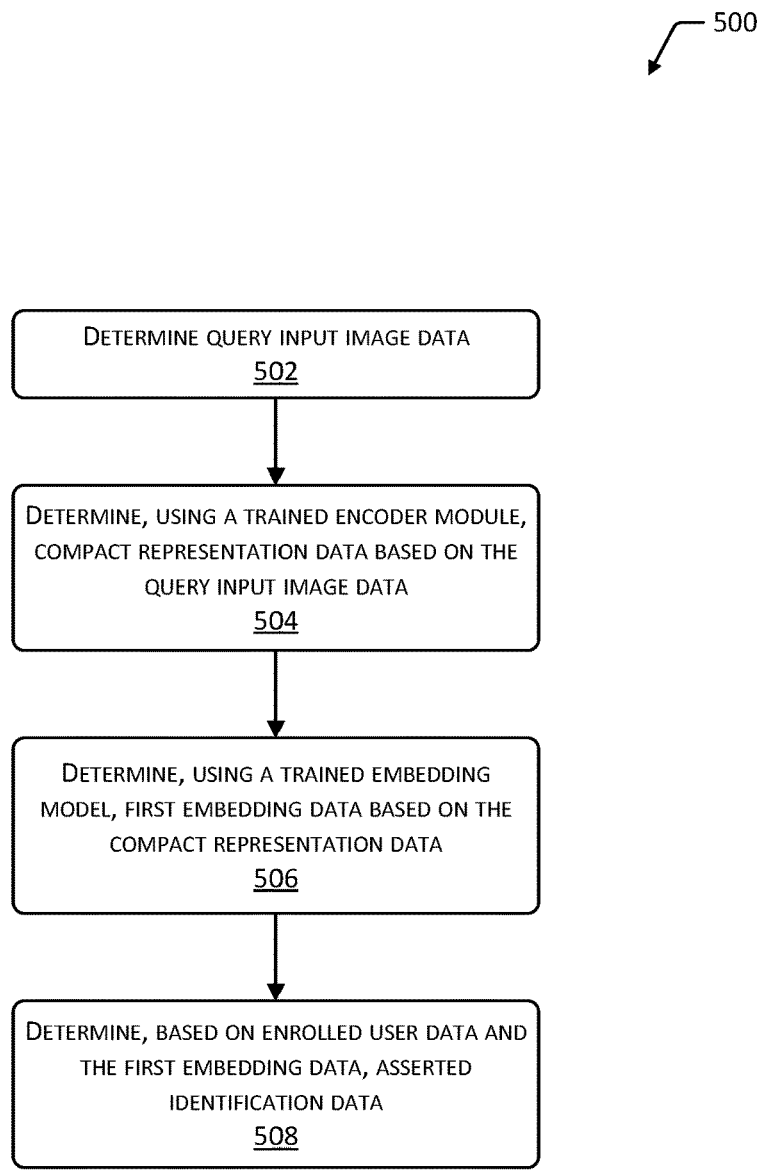
FIG. 5 illustrates a process of determining asserted identification data using a compact representation, according to some implementations.

FIG. 5 illustrates at 500 a process of determining asserted identification data 164 using compact representation data 136, according to some implementations. The process may be implemented at least in part using one or more computing devices 106.

At 502 a query input image is determined. For example, the scanner 104 may be used to acquire input image data 112. The input image data 112 may comprise one or more modalities.

At 504 determine, using the query input image as an input to the trained encoder module 132, first query compact representation data 136. The trained encoder module 132 may implement at least a portion of the weight data 134.

At 506 query embedding data 162 is determined using a trained embedding model 142 based on the first compact representation data 136. For example, the first compact representation data 136 is provided as input to the embedding network module 140 comprising the trained embedding model 142 that provides as output the query embedding data 162.

At 508 determine asserted identification data 164 based on enrolled user data 152 and the query embedding data 162. For example, the comparison module 160 may compare the query embedding data 162 and the embedding data 146 stored in the enrolled user data 152 to determine the asserted identification data 164.

Figure 6:
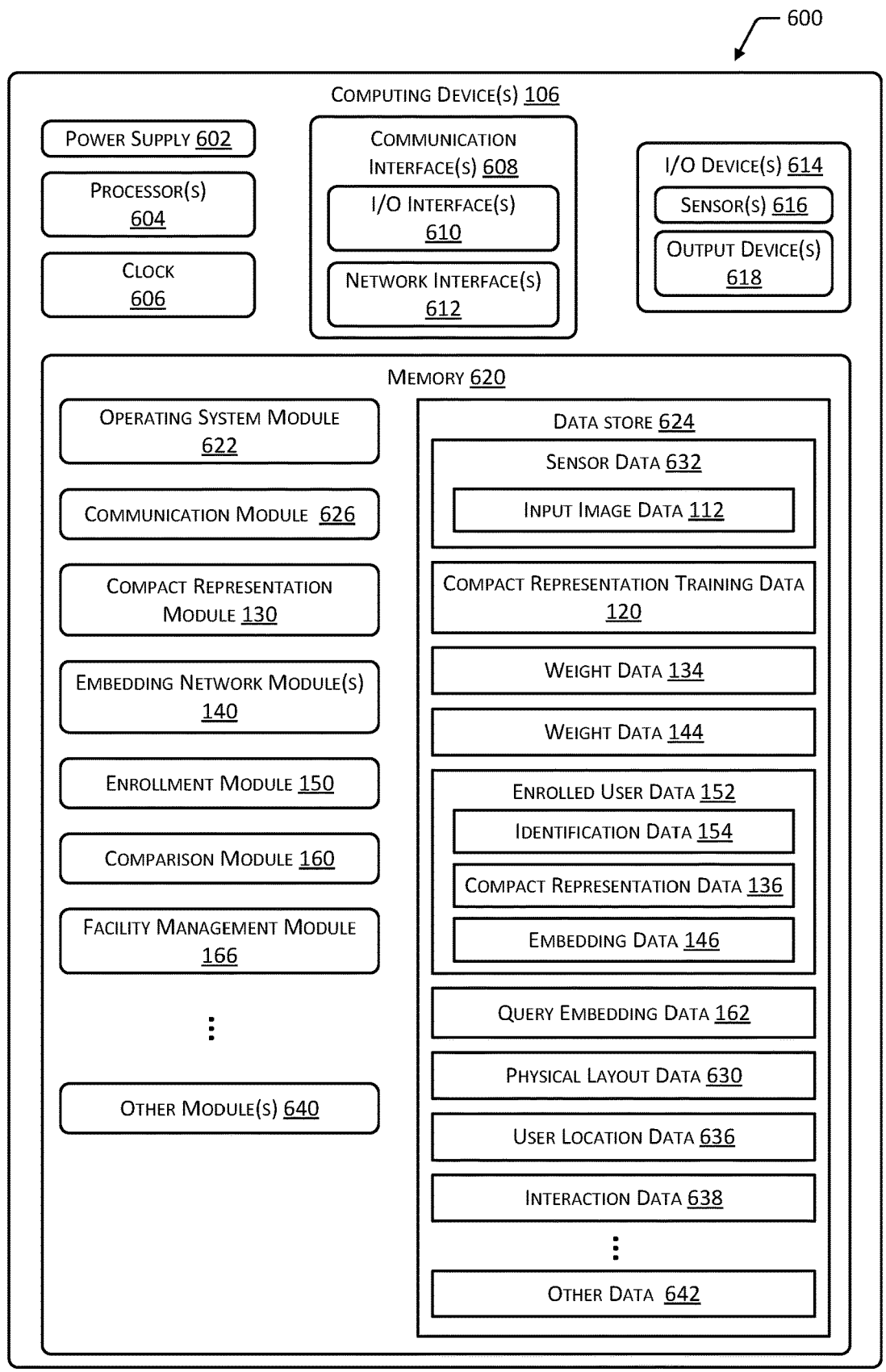
FIG. 6 is a block diagram of a computing device to implement the system, according to some implementations.

FIG. 6 is a block diagram 600 of a computing device 106 to implement the system 100, according to some implementations. The computing device 106 may be within the scanner 104, may comprise a server, and so forth. The computing device 106 may be physically present at the facility, may be accessible by a network, or a combination of both. The computing device 106 does not require end-user knowledge of the physical location and configuration of the system that delivers the services. Common expressions associated with the computing device 106 may include "embedded system", "on-demand computing", "software as a service (SaaS)", "platform computing", "network-accessible platform", "cloud services", "data centers", and so forth. Services provided by the computing device 106 may be distributed across one or more physical or virtual devices.

One or more power supplies 602 may be configured to provide electrical power suitable for operating the components in the computing device 106. The one or more power supplies 602 may comprise batteries, capacitors, fuel cells, photovoltaic cells, wireless power receivers, conductive couplings suitable for attachment to a power source such as provided by an electric utility, and so forth. The computing device 106 may include one or more hardware processors 604 (processors) configured to execute one or more stored instructions. The processors 604 may comprise one or more cores. One or more clocks 606 may provide information indicative of date, time, ticks, and so forth. For example, the processor 604 may use data from the clock 606 to associate a particular interaction with a particular point in time.

The computing device 106 may include one or more communication interfaces 608 such as input/output (I/O) interfaces 610, network interfaces 612, and so forth. The communication interfaces 608 enable the computing device 106, or components thereof, to communicate with other devices or components. The communication interfaces 608 may include one or more I/O interfaces 610. The I/O interfaces 610 may comprise Inter-Integrated Circuit (I2C), Serial Peripheral Interface bus (SPI), Universal Serial Bus (USB) as promulgated by the USB Implementers Forum, RS-232, and so forth.

The I/O interface(s) 610 may couple to one or more I/O devices 614. The I/O devices 614 may include input devices such as one or more of a sensor 616, keyboard, mouse, scanner, and so forth. The I/O devices 614 may also include output devices 618 such as one or more of a display device, printer, audio speakers, and so forth. In some embodiments, the I/O devices 614 may be physically incorporated with the computing device 106 or may be externally placed. The sensors 616 may comprise the camera 108, smartcard readers, touch sensors, microphones, and so forth.

The network interfaces 612 may be configured to provide communications between the computing device 106 and other devices, such as routers, access points, and so forth. The network interfaces 612 may include devices configured to couple to personal area networks (PANs), local area networks (LANs), wireless local area networks (WLANs), wide area networks (WANs), and so forth. For example, the network interfaces 612 may include devices compatible with Ethernet, Wi-Fi, Bluetooth, and so forth.

The computing device 106 may also include one or more buses or other internal communications hardware or software that allow for the transfer of data between the various modules and components of the computing device 106.

As shown in FIG. 6, the computing device 106 includes one or more memories 620. The memory 620 may comprise one or more non-transitory computer-readable storage media (CRSM). The CRSM may be any one or more of an electronic storage medium, a magnetic storage medium, an optical storage medium, a quantum storage medium, a mechanical computer storage medium, and so forth. The memory 620 provides storage of computer-readable instructions, data structures, program modules, and other data for the operation of the computing device 106. A few example functional modules are shown stored in the memory 620, although the same functionality may alternatively be implemented in hardware, firmware, or as a system on a chip (SoC).

The memory 620 may include at least one operating system (OS) module 622. The OS module 622 is configured to manage hardware resource devices such as the I/O interfaces 610, the I/O devices 614, the communication interfaces 608, and provide various services to applications or modules executing on the processors 604. The OS module 622 may implement a variant of the FreeBSD operating system as promulgated by the FreeBSD Project; other UNIX or UNIX-like variants; a variation of the Linux operating system as promulgated by Linus Torvalds; the Windows operating system from Microsoft Corporation of Redmond, Washington, USA; and so forth.

A communication module 626 may be configured to establish communications with the computing device 106, servers, other computing devices 106, or other devices. The communications may be authenticated, encrypted, and so forth.

Also stored in the memory 620 may be a data store 624 and one or more of the following modules. These modules may be executed as foreground applications, background tasks, daemons, and so forth. The data store 624 may use a flat file, database, linked list, tree, executable code, script, or other data structure to store information. In some implementations, the data store 624 or a portion of the data store 624 may be distributed across one or more other devices including other computing devices 106, network attached storage devices, and so forth.

The data store 624 may store one or more of the compact representation training data 120, weight data 134, weight data 144, enrolled user data 152, query embedding data 162, and so forth. The memory 620 may store the compact representation module 130, the enrollment module(s) 150, the comparison module 160, the facility management module 166, and so forth.

In some implementations, the input image data 112 may be temporarily stored during processing by the compact representation module 130. For example, the scanner 104 may acquire the input image data 112, determine the compact representation data 136 based on the input image data 112, and then erase the input image data 112. The resulting compact representation data 136 may then be sent to a server or other computing device 106 to perform enrollment, comparison to assert an identity, and so forth.

The compact representation module 130 or a portion thereof, such as the trained encoder module 132 may determine the compact representation data 136 based on input image data 112.

The embedding network modules 140 accept as input one or more of the input image data 112 or the compact representation data 136 and determine embedding data 146.

The enrollment module 150 may be used to determine the enrolled user data 152.

The facility management module 166 may perform various functions, such as tracking items between different inventory locations, to and from carts, generating restocking orders, directing operation of robots within the facility, using the asserted identification data 164 to associate a particular user identity with a user in the facility, and so forth. During operation, the facility management module 166 may access sensor data 632 such as input image data 112, or data from other sensors.

Information used by the facility management module 166 may be stored in the data store 624. For example, the data store 624 may be used to store physical layout data 630, sensor data 632, asserted identification data 164 (not shown), user location data 636, interaction data 638, and so forth. For example, the sensor data 632 may comprise the input image data 112 obtained from a scanner 104 associated with the facility.

The physical layout data 630 may provide information indicative of where scanners 104, cameras, weight sensors, antennas for radio receivers, inventory locations, and so forth are in the facility with respect to one another. For example, the physical layout data 630 may comprise information representative of a map or floor plan of the facility with relative positions of gates with scanners 104 and inventory locations.

The facility management module 166 may generate the user location data 636 that is indicative of the location of the user within the facility. For example, the facility management module 166 may use image data obtained by the cameras to determine a location of the user. In other implementations, other techniques may be used for determining the user location data 636. For example, data from a smart floor may be used to determine the location of the user.

The identification data 154 may be associated with user location data 636. For example, the user enters the facility and has their hand 102 scanned by the scanner 104, resulting in asserted identification data 164 that is associated with their time of entry and the scanner 104 location. The user location data 636 indicative of a path of a user that begins at the scanner 104 location at the time of entry may be associated with the user identifier in the asserted identification data 164.

Based on the user location data 636 and the interaction data 638, a particular interaction may be associated with an account of a particular user. For example, if the user location data 636 indicates that the user is present in front of inventory location 692 at time 09:02:02 and the interaction data 638 indicates a pick of a quantity of one item from an area on inventory location 692 at 09:04:13, the user may be billed for that pick.

The facility management module 166 may use the sensor data 632 to generate the interaction data 638. The interaction data 638 may include information about the type of item involved, quantity involved, whether the interaction was a pick or place, and so forth. Interactions may include the user picking an item from an inventory location, placing an item at the inventory location, touching an item at the inventory location, rummaging through items at the inventory location, and so forth. For example, the facility management module 166 may generate interaction data 638 that indicates what item the user picked from a particular lane on a shelf, and then use this interaction data 638 to adjust the count of inventory stowed at that lane. The interaction data 638 may then be used to bill an account associated with the user identifier that is associated with the user who picked the item.

The facility management module 166 may process the sensor data 632 and generate output data. For example, based on the interaction data 638, a quantity of a type of item at a particular inventory location may drop below a threshold restocking level. The system may generate output data comprising a restocking order indicative of the inventory location, the area, and a quantity needed to replenish stock to a predetermined level. The restocking order may then be used to direct a robot to restock that inventory location.

Other modules 640 may also be present in the memory 620 as well as other data 642 in the data store 624. For example, a billing module may use the interaction data 638 and the asserted identification data 164 to bill an account associated with a particular user.

The devices and techniques described in this disclosure may be used in a variety of other settings. For example, the system 100 may be used in conjunction with a point-of-sale (POS) device. The user may present their hand 102 to a scanner 104 to provide an indication of intent and authorization to pay with an account associated with the asserted identification data 164. In another example, a robot may incorporate a scanner 104. The robot may use the asserted identification data 164 to determine whether to deliver a parcel to the user, and based on the asserted identification data 164, which parcel to deliver.

While the input to the system 100 is discussed with respect to image data, the system may be used with other types of input. For example, the input may comprise data acquired from one or more sensors, data generated by another system, and so forth. For example, instead of image data produced by the camera 108, the input to the system 100 may comprise an array of data. In other examples, the input to the system 100 may comprise one or more of audio data, point cloud data, and so forth. Other modalities may also be used. For example, the first modality may be visible light, the second modality may be sonar, and so forth.

The processes discussed herein may be implemented in hardware, software, or a combination thereof. In the context of software, the described operations represent computer-executable instructions stored on one or more non-transitory computer-readable storage media that, when executed by one or more processors, perform the recited operations. Generally, computer-executable instructions include routines, programs, objects, components, data structures, and the like that perform particular functions or implement particular abstract data types. Those having ordinary skill in the art will readily recognize that certain steps or operations illustrated in the figures above may be eliminated, combined, or performed in an alternate order. Any steps or operations may be performed serially or in parallel. Furthermore, the order in which the operations are described is not intended to be construed as a limitation.

Embodiments may be provided as a software program or computer program product including a non-transitory computer-readable storage medium having stored thereon instructions (in compressed or uncompressed form) that may be used to program a computer (or other electronic device) to perform processes or methods described herein. The computer-readable storage medium may be one or more of an electronic storage medium, a magnetic storage medium, an optical storage medium, a quantum storage medium, and so forth. For example, the computer-readable storage media may include, but is not limited to, hard drives, optical disks, read-only memories (ROMs), random access memories (RAMs), erasable programmable ROMs (EPROMs), electrically erasable programmable ROMs (EEPROMs), flash memory, magnetic or optical cards, solid-state memory devices, or other types of physical media suitable for storing electronic instructions. Further, embodiments may also be provided as a computer program product including a transitory machine-readable signal (in compressed or uncompressed form). Examples of transitory machine-readable signals, whether modulated using a carrier or unmodulated, include, but are not limited to, signals that a computer system or machine hosting or running a computer program can be configured to access, including signals transferred by one or more networks. For example, the transitory machine-readable signal may comprise transmission of software by the Internet.

Separate instances of these programs can be executed on or distributed across any number of separate computer systems. Thus, although certain steps have been described as being performed by certain devices, software programs, processes, or entities, this need not be the case, and a variety of alternative implementations will be understood by those having ordinary skill in the art.

Additionally, those having ordinary skill in the art will readily recognize that the techniques described above can be utilized in a variety of devices, environments, and situations. Although the subject matter has been described in language specific to structural features or methodological acts, it is to be understood that the subject matter defined in the appended claims is not necessarily limited to the specific features or acts described. Rather, the specific features and acts are disclosed as illustrative forms of implementing the claims.

What is claimed is:

1. A method comprising:
   accessing training input data comprising image data;
   training an encoder module to produce a compact representation of the image data using the training input data and a loss function comprising:
     a bitrate loss,
     a distortion loss, and
     an embedding loss; and
   storing weight data associated with training the encoder module.

2. The method of claim 1, wherein the bitrate loss ($L_r$) is determined as:

$$L_r = BPP(z) + BPP(h)$$

where BPP(z) is bits per pixel of first output from an entropy encoding encoder, and
BPP(h) is bits per pixel of second output from a hyper encoder.

3. The method of claim 1, wherein the distortion loss ⟦ ($L$ ⟧ $_d$) is determined as one of:

$$L_d = MSE(\hat{x}, x), \text{ or}$$

$$L_d = MS_{SSIM}(\hat{x}, x)$$

where x is a first image in the training input data,
$\hat{x}$ is a second image that is reconstructed from output of the encoder module,
MSE is a mean-square error function, and
MS_SSIM is a multi-scale structural similarity index measure function.

4. The method of claim 1, wherein the embedding loss ⟦ ($L$ ⟧ $_e$) is determined as:

$$L_e = \text{cosine}_{distance(\hat{e}, e)}$$

where e is first embedding data based on a first image in the training input data and $\hat{e}$ is second embedding data based on a second image that is reconstructed from output of the encoder module.

5. The method of claim 1, wherein during training the encoder module is in communication with: a quantization module, a hyper encoder module, an entropy encoding encoder module, a hyper decoder module, an entropy encoding decoder module, a decoder module, and an embedding module.

6. The method of claim 1, wherein during training the encoder module is in communication with a decoder module having second weight data; and further comprising:
   deleting the second weight data.

7. The method of claim 1, further comprising:
   accessing a first input image;
   determining first data based on processing the first input image using the encoder module and the weight data; and
   storing the first data.

8. The method of claim 1, further comprising:
   accessing a first input image of at least a portion of a first user;
   determining, based on processing the first input image using the encoder module and the weight data, first data;
   determining identification data associated with the first user; and
   associating the identification data with the first data.

9. The method of claim 1, further comprising:
   determining second training input data comprising a plurality of input image data;
   determining, based on processing the plurality of input image data using the encoder module and the weight data, a first set of first data; and
   training a first embedding model using the first set of first data.

10. A system comprising:
    a memory, storing first computer-executable instructions; and
    a hardware processor to execute the first computer-executable instructions to:
      access training input data comprising input data;
      train an encoder module to produce a compact representation of the input data using the training input data and a loss function comprising:
        a distortion loss, and
        an embedding loss, wherein during training the encoder module, the encoder module is in communication with one or more of:
          a quantization module,
          a hyper encoder module,
          an entropy encoding encoder module,
          a hyper decoder module,
          an entropy encoding decoder module,
          a decoder module, or
          an embedding module; and
      store weight data associated with training the encoder module.

11. The system of claim 10, wherein:
    the distortion loss ⟦ ($L$ ⟧ $_d$) is determined as one of:

$$L_d = MSE(\hat{x}, x), \text{ or}$$

$$L_d = MS_{SSIM}(\hat{x}, x)$$

where x is a first input in the training input data, x̂ is a second input that is reconstructed from output of the encoder module, MSE is a mean-square error function, and MS_SSIM is a multi-scale structural similarity index measure function; and wherein the embedding loss ($L_e$) is determined as:

$$L_e = \text{cosine}_{distance(\hat{e},e)}$$

where e is first embedding data based on the first input and ê is second embedding data based on the second input.

12. The system of claim 10, the loss function further comprising a bitrate loss (L_r) that is determined as:

$$L_r = BPP(z) + BPP(h)$$

where BPP(z) is bits per pixel of first output from an entropy encoding encoder, and BPP(h) is bits per pixel of second output from a hyper encoder.

13. The system of claim 10, further comprising instructions to:

access first input data;

determine first data based on processing the first input data using the encoder module and the weight data; and store the first data.

14. The system of claim 10, further comprising instructions to:

determine second training input data comprising a plurality of input data;

determine, based on processing the plurality of input data using the encoder module and the weight data, a first set of first data;

train a first embedding model using the first set of first data; and store second weight data associated with training the first embedding model.

15. A system comprising:

a memory, storing first computer-executable instructions; and a hardware processor to execute the first computer-executable instructions to:

access first training input data comprising a first image;

train an encoder module using the first training input data and one or more loss functions;

determine weight data associated with training the encoder module;

determine second training input data comprising a plurality of input data;

determine a first set of data based on processing the plurality of input data using the encoder module and the weight data; and train a first embedding model using the first set of data.

16. The system of claim 15, wherein the one or more loss functions include a distortion loss; wherein the distortion loss ($L_d$) is determined as one of:

$$L_d = MSE(\hat{x},x), \text{ or}$$

$$L_d = MS_{SSIM(\hat{x},x)}$$

where x is a first input in the first training input data, x̂ is a second input that is reconstructed from output of the encoder module, MSE is a mean-square error function, and MS_SSIM is a multi-scale structural similarity index measure function.

17. The system of claim 15, wherein the one or more loss functions include an embedding loss; wherein the embedding loss ($L_e$) is determined as:

$$L_e = \text{cosine}_{distance(\hat{e},e)}$$

where e is first embedding data based on a first image in the first training input data and ê is second embedding data based on a second image that is reconstructed from output of the encoder module.

18. The system of claim 15, wherein the one or more loss functions include a bitrate loss; wherein the bitrate loss (L_r) is determined as:

$$L_r = BPP(z) + BPP(h)$$

where BPP(z) is bits per pixel of first output from an entropy encoding encoder, and BPP(h) is bits per pixel of second output from a hyper encoder.

19. The system of claim 15, further comprising instructions to:

access a first input image;

determine first data based on processing the first input image using the encoder module and the weight data; and store the first data.

20. The system of claim 15, further comprising instructions to:

access a first input image of at least a portion of a first user;

determine first data based on processing the first input image using the encoder module and the weight data;

determine identification data associated with the first user; and associate the identification data with the first data.

* * * * *